United States Patent
Gonzalez et al.

(10) Patent No.: US 11,734,073 B2
(45) Date of Patent: Aug. 22, 2023

(54) SYSTEMS AND METHODS FOR AUTOMATICALLY SCALING COMPUTE RESOURCES BASED ON DEMAND

(71) Applicants: Atlassian Pty Ltd., Sydney (AU); Atlassian Inc., San Francisco, CA (US)

(72) Inventors: Jacob Christopher Joseph Gonzalez, Sydney (AU); Alexander William Price, Sydney (AU); David Angot, Bondi Junction (AU); Nicholas Young, Newton (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 245 days.

(21) Appl. No.: 17/337,336

(22) Filed: Jun. 2, 2021

(65) Prior Publication Data
US 2021/0294658 A1    Sep. 23, 2021

Related U.S. Application Data

(63) Continuation of application No. 16/368,122, filed on Mar. 28, 2019, now Pat. No. 11,030,009.

(51) Int. Cl.
*G06F 9/50* (2006.01)

(52) U.S. Cl.
CPC .................. *G06F 9/5027* (2013.01)

(58) Field of Classification Search
None
See application file for complete search history.

(56) References Cited

U.S. PATENT DOCUMENTS

| | | |
|---|---|---|
| 8,332,860 B1 | 12/2012 | Yahalom et al. |
| 9,009,722 B2 | 4/2015 | Bello et al. |
| 9,438,529 B1 * | 9/2016 | Kowalski ................ H04L 43/04 |
| 9,594,585 B2 * | 3/2017 | Uchikawa ........... G06F 9/45558 |
| 9,645,847 B1 * | 5/2017 | Roth ........................ G06F 9/461 |
| 9,971,621 B1 | 5/2018 | Berg et al. |
| 10,182,033 B1 | 1/2019 | Farhangi et al. |
| 10,191,778 B1 | 1/2019 | Yang et al. |
| 10,235,625 B1 | 3/2019 | Walters et al. |
| 10,324,763 B1 | 6/2019 | Abdelsalam et al. |

(Continued)

*Primary Examiner* — Adam Lee
(74) *Attorney, Agent, or Firm* — Brownstein Hyatt Farber Schreck, LLP (57) ABSTRACT

System and methods for automatically scaling compute resources in a compute group. The method includes determining compute capacity required to complete job requests and determining allocable compute capacity available on the compute resources in the compute group. The method further includes calculating a utilization of the compute group based on the required compute capacity and allocable compute capacity and determining whether the calculated utilization is above a first threshold value or below a second threshold value; upon determining that the calculated utilization is above the first threshold value the method calculates a number of compute resources required to bring the utilization below the first threshold value and causes an increase in the number of compute resources in the compute group based on the calculated number. Upon determining that the calculated utilization falls below the second threshold value the method causes a reduction in the number of active compute resources.

18 Claims, 7 Drawing Sheets

(56) References Cited

U.S. PATENT DOCUMENTS

| | | |
|---|---|---|
| 10,476,742 B1 | 11/2019 | Szarvas et al. |
| 10,496,432 B1 | 12/2019 | Zhang et al. |
| 2010/0322088 A1 | 12/2010 | Muthiah et al. |
| 2012/0185848 A1 | 7/2012 | Devarakonda et al. |
| 2013/0047158 A1 | 2/2013 | Jadhav et al. |
| 2013/0111035 A1 | 5/2013 | Alapati et al. |
| 2013/0254384 A1 | 9/2013 | Wray et al. |
| 2013/0339949 A1* | 12/2013 | Spiers .................. G06F 9/45558 718/1 |
| 2014/0026133 A1* | 1/2014 | Parker .................. G06F 9/5083 718/1 |
| 2014/0068611 A1 | 3/2014 | McGrath et al. |
| 2014/0082612 A1 | 3/2014 | Breitgand et al. |
| 2014/0089917 A1* | 3/2014 | Attalla .................. G06F 9/5083 718/1 |
| 2014/0280918 A1 | 9/2014 | Grandhe et al. |
| 2014/0282591 A1 | 9/2014 | Stich et al. |
| 2014/0304399 A1 | 10/2014 | Chaudhary et al. |
| 2015/0058265 A1 | 2/2015 | Padala et al. |
| 2015/0143382 A1* | 5/2015 | Chen .................. G06F 9/5027 718/104 |
| 2016/0028855 A1 | 1/2016 | Goyal et al. |
| 2016/0055025 A1* | 2/2016 | Jul ...................... G06F 9/5083 718/1 |
| 2016/0103717 A1 | 4/2016 | Dettori et al. |
| 2016/0117180 A1 | 4/2016 | Cardonha et al. |
| 2016/0179560 A1 | 6/2016 | Ganguli et al. |
| 2016/0275412 A1 | 9/2016 | Lu et al. |
| 2016/0352649 A1 | 12/2016 | Lin et al. |
| 2017/0034064 A1 | 2/2017 | Everhart et al. |
| 2017/0228257 A1* | 8/2017 | Dong .................... G06Q 10/04 |
| 2017/0331907 A1* | 11/2017 | Jagannath ............... H04L 43/16 |
| 2017/0339065 A1 | 11/2017 | Li et al. |
| 2018/0039516 A1 | 2/2018 | Biran et al. |
| 2018/0067771 A1 | 3/2018 | Frandzel et al. |
| 2018/0225139 A1 | 8/2018 | Hahn et al. |
| 2018/0241812 A1 | 8/2018 | Marchetti et al. |
| 2018/0255137 A1 | 9/2018 | Hu et al. |
| 2018/0278725 A1* | 9/2018 | Thayer .................. G06F 16/252 |
| 2018/0287898 A1 | 10/2018 | Bellini, III et al. |
| 2018/0343169 A1 | 11/2018 | Stephens et al. |
| 2019/0042322 A1 | 2/2019 | Calhoun et al. |
| 2019/0109908 A1 | 4/2019 | Kulkarni et al. |
| 2019/0121675 A1 | 4/2019 | Smola et al. |
| 2019/0138338 A1 | 5/2019 | Shimogawa et al. |
| 2019/0146847 A1* | 5/2019 | Gibson .................. G06F 9/5011 718/104 |
| 2020/0007456 A1* | 1/2020 | Greenstein ............ H04L 47/823 |
| 2020/0192708 A1 | 6/2020 | Wu et al. |

\* cited by examiner

SYSTEMS AND METHODS FOR AUTOMATICALLY SCALING COMPUTE RESOURCES BASED ON DEMAND

CROSS-REFERENCE TO RELATED APPLICATION(S)

This application is a continuation patent application of U.S. patent application Ser. No. 16/368,122, filed Mar. 28, 2019 and titled "Systems and Methods for Automatically Scaling Compute Resources Based on Demand," the disclosure of which is hereby incorporated herein by reference in its entirety.

FIELD

Aspects of the present disclosure are directed to systems and methods for auto-scaling compute resources based on demand.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Container-based virtualization or containerization is an alternative technology to the more traditional hypervisor based virtualization. In container-based virtualization, software applications/programs are executed within 'containers'. Each container includes not only the application that needs to be executed but everything needed to run the application including runtime, system libraries, system tools, and settings. Accordingly, each container can be considered a deployable unit of software that packages up code and all its dependencies so that an application can run quickly and reliably from one computing environment to another. Typically, in container-based virtualization, multiple containers share the hardware resources of a single operating system.

To manage the creation, destruction, deployment and scaling of containers, a number of container orchestration systems have been introduced. These include, e.g., Kubernetes, Docker Swarm, Nomad, etc. Most of these container orchestration systems offer some sort of auto-scaling capabilities—i.e., they are configured to monitor demand and automatically increase/decrease the available compute resources (i.e., processor and/or memory) for containers based on the monitored demand. However, most auto-scaling capabilities offered by known container orchestration systems are configured to increase or decrease compute resources gradually and linearly.

Accordingly, although such auto-scaling capabilities may be suitable for long-term applications or for situations where demand increases or decreases gradually over time, they are often unsuitable for short-running applications (e.g., deployments) and/or for cases where demand increases and decreases sharply and sporadically during the day. In such cases more responsive auto-scaling is desirable.

SUMMARY

The appended claims may serve as a summary of the invention.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described previously, although most container orchestration systems offer auto-scaling features, their auto-scaling functionality is more suitable to executing or hosting long term applications and/or hosting applications where demand increases/decreases gradually and/or at specific times during the day. However, these auto-scaling offerings are typically ineffective or inefficient when dealing with job-based or batch workloads (such as builds or deployments). Job-based workloads are typically short-term executions that may be scheduled to execute at specific times. For example, a team may schedule all its synthetic tests to be executed every hour or schedule a number of builds at 9 am each morning. In these cases, there may be little to no compute resource demand for a certain period in the day followed by a very high compute resource demand for a short period, which is again followed by little to no compute resource demand. The auto-scaling capabilities offered by conventional container orchestration systems fail to scale up or down effectively in response to such sudden changes in demand levels.

For instance, it was noticed that the auto-scaling feature offered by Kubernetes, a container orchestration system, failed to add enough compute resources when concurrent jobs suddenly ramped up, thereby forcing users to wait minutes before additional resources could be booted to service the ramped-up load. This is not an ideal situation especially in cases where a scheduled job is configured to timeout or fail in the event of extended delays. Similarly, it was noticed that when concurrently scheduled jobs were completed, the Kubernetes auto-scaler did not scale down or deactivate unused compute resources quickly enough. Sometimes it was noticed that unused compute resources were not deactivated for up to 24 hours. Although this does not necessarily affect execution of scheduled jobs, it affects an organization's bottom line as the organization has to pay for any compute resources assigned to the organization. This might not seem like a huge problem when an organization uses a small number of containers, but becomes a big problem when an organization uses hundreds or thousands of containers on a daily basis.

To address one of more of these issues, embodiments of the present disclosure introduce a new auto-scaling method and system to optimize end-user experience and minimize compute resource costs. The presently disclosed auto-scaling systems and methods achieve this by providing a buffer capacity when calculating resource requirements thereby allowing the compute resources allocated to a particular project/organization (also referred to as a compute group herein) to scale-up before the compute resources reach capacity. In particular, the auto-scaling systems and methods calculate the capacity (e.g., processor and memory requirements) required to perform scheduled tasks and the actual capacity (e.g., the available processor and memory) available to determine the utilization of the assigned resources. If the utilization is determined to be above a first threshold (which can be set to include the buffer capacity), the resources are scaled up—i.e., more computing resources are activated. Alternatively, if the utilization is determined to be below a second threshold, the resources are scaled down—i.e., underutilized or unused computing resources are released. If the utilization is calculated to be within the first and second thresholds, no scale-up or scale-down action is taken.

This calculation and decision making is performed periodically—e.g., every 30 seconds, every minute, every 5 minutes, and so on depending on the type of job-based workloads the auto-scaling system is configured to handle. Furthermore, the first and/or second thresholds may be programmed or predetermined based on the amount of buffer required in the event of a spike in scheduled jobs.

In certain embodiments, instead of releasing computing resources (e.g., a physical or virtual machine) when the calculated utilization reaches below a threshold value, unused physical or virtual machines may be marked such that no new jobs are assigned to these machines. Instead, new jobs may be assigned to other active but underutilized machines. In these embodiments, if the calculated utilization within a certain time period exceeds the first threshold, one or more of the marked machines (depending on requirement) may be unmarked such that they can once again accept new jobs. Alternatively, if the calculated utilization does not exceed the first threshold for a certain time period, one or more of the marked machines may be released. This way some compute resources may be maintained in standby mode for a certain period of time so that they can quickly be utilized if demand ramps-up suddenly.

Further still, in some embodiments, the auto-scaling system can operate in different scale-down modes—fast or slow—depending on the rate at which the job load reduces. In the fast mode, the auto-scaling system may mark or terminate more number of resources in one cycle to allow the resources to scale down quickly if demand reduces drastically. Conversely, in the slow mode, the auto-scaling system marks or terminates fewer resources in one cycle to allow resources to scale down more gradually.

In the present disclosure, aspects of the auto-scaling systems and methods will be described in the context of container-based virtualization. However, it will be appreciated that this is merely an example application of the disclosed auto-scaling systems and methods, which can also be utilized in traditional hypervisor based virtualization or with any platform or system that offers compute resources based on user demand.

These and other aspects of the present disclosure will be described in detail with reference to FIGS. 1-5 below.

Environment Overview

Figure 1:
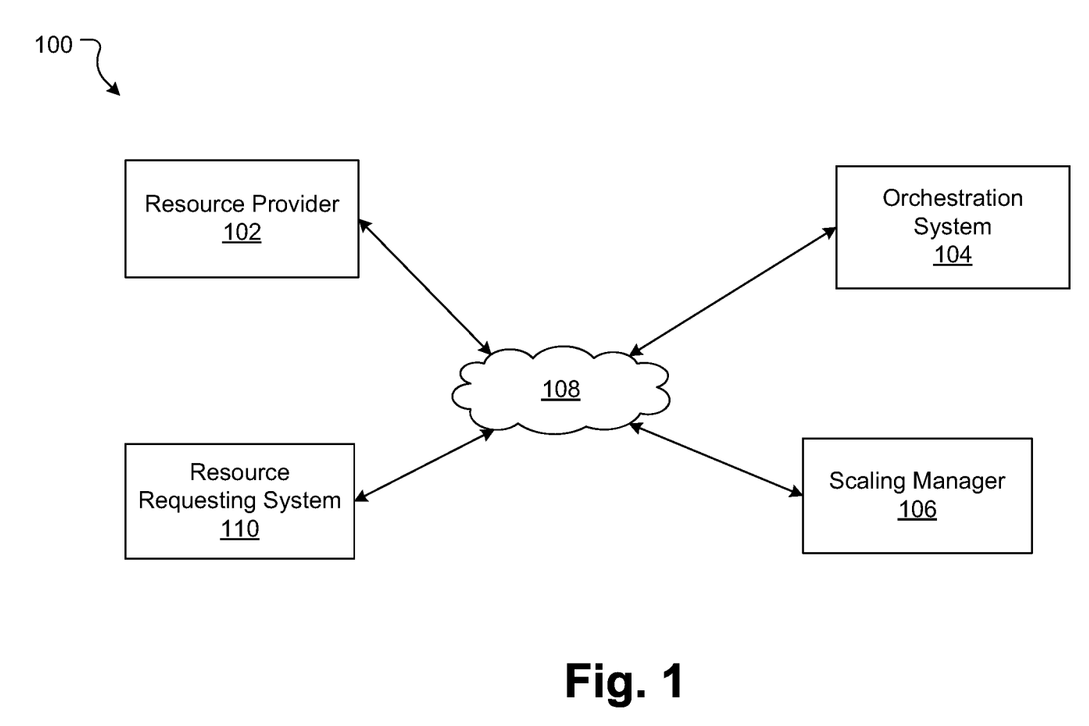
FIG. 1 is a block diagram of a networked environment according to some embodiments of the present disclosure.

FIG. 1 illustrates an environment 100 in which one or more aspects of the present disclosure are implemented. Specifically, FIG. 1 illustrates the systems involved in automatically scaling compute resources based on real time demand. As used herein, compute resources refer to physical or virtual machines that are allocated predetermined units of CPU and memory.

The systems in environment 100 include a resource provider 102, an orchestration system 104, and a scaling manager 106. The resource provider 102, orchestration system 104 and scaling manager 106 communicate with each other over one or more communication networks 108. In addition to these core elements, the environment 100 further includes one or more resource requesting systems 110. The following section describes each of these systems and then proceeds to describe how they interact with each other.

The resource provider 102 provides infrastructure (i.e., the compute resources) required to execute scheduled jobs. The infrastructure may be provided via one or more on-premises data centers or one or more remote data centers hosted by a cloud service provider such as Amazon Web Services. Further, the resource provider 102 may assign infrastructure in the form of physical machines or virtual machines. In any case, a resource requesting system 110 may communicate with the resource provider 102 and request the resource provider to assign certain resources (e.g., CPU and memory) to the resource requesting system 110. The resource provider 102 in turn may then determine the number of physical and/or virtual machines that would be required to fulfil the desired CPU and memory requirements and assign these physical or virtual machines to the resource requesting system 110. The collection of compute resources assigned to the resource requesting system 110 at any given time is called a compute group.

The resource provider 102 is also configured to increase or decrease the compute resources assigned in a compute group. In certain cases, the resource provider 102 may be configured to automatically scale the compute resources in the compute group based on monitored demand. In other cases, the resource provider 102 may be configured to scale-up or scale-down the assigned number of assigned physical/virtual machines based on external instructions.

The orchestration system 104 is configured to automate the assignment and management of scheduled jobs. In particular, it is configured to assign jobs to the physical/virtual machines provided by the resource provider 102. To this end, the orchestration system 104 determines the virtual/physical machines assigned to a particular resource requesting system 110 and automatically assigns a scheduled job from the resource requesting system 110 to a virtual/physical machine assigned to that resource requesting system 110 or compute group. In addition, the orchestration system 104 is configured to manage job deployments and scale the underlying compute group based on demand.

In container-based virtualization, the orchestration system 104 is configured to receive job descriptors from the resource requesting system 110, create containers based on the received job descriptors and launch these containers on the physical/virtual machines in a compute group. Typically, the orchestration system 104 launches containers on the underlying machines in a manner that distributes the load evenly among the active machines. Examples of orchestration systems include Kubernetes, Docker Swarm, Titus, Nomad, etc.

For a particular resource requesting system 106, the scaling manager 106 is configured to determine real time resource requirements and scale-up or scale-down the resources to meet the resource requirements and prevent under-utilization of resources. In particular, the scaling manager 106 is configured to determine the available resources in a compute group and the required compute capacity and calculate a utilization of the underlying resources. If the resource utilization exceeds a predetermined upper threshold, the scaling manager 106 instructs the resource provider 102 to assign more resources to compute group. Alternatively, if the utilization is below a predetermined lower threshold, the scaling manager 106 may instruct the resource provider to terminate certain resources in the compute group.

In certain embodiments, instead of requesting the resource provider 102 to terminate resources immediately, the scaling manager 106 marks one or more unused physical/virtual machines such that the orchestration system 104 cannot assign any new containers to the marked physical/virtual machines. These machines remain marked for a certain period of time. If resource demand suddenly increases during this time period (i.e., the calculated utilization exceeds the upper threshold), the scaling manager 106 unmarks one or more of these physical/virtual machines thereby allowing the orchestration system 104 to once again assign containers to these machines. Alternatively, if the resource demand does not increase beyond the upper threshold during this time period, the scaling manager 106 requests the resource provider to terminate the marked physical/virtual machines.

Accordingly, the scaling manager 106 communicates with the orchestration system 104 to collect information about active compute resources and resource requirements and communicates with the resource provider 102 to instruct the resource provider to scale-up or scale-down the underlying resources.

The resource requesting system 110 can be any system that creates and/or manages jobs (e.g., synthetic tests, builds, deployments, etc.). The resource requesting system 110 communicates with the resource provider 102 to provision infrastructure and communicates with the orchestration system 104 to provision one or more containers for executing the jobs on the provisioned infrastructure.

In one example, the resource requesting system 110 may be a continuous integration/continuous deployment (CI/CD) tool such as Bitbucket Pipelines (offered by Atlassian, Inc.) that is configured to manage builds. The CI/CD tool detects whether source code in a repository that is registered for continuous integration is updated, retrieves a build description associated with that source code from the repository, and creates a job description for initializing one or more containers to test and/or build the source code based on the build description. Along with other factors, the job description typically specifies an allocation of resources to complete the job. In certain embodiments, if the allocation of resources is not specified, a default amount of memory and CPU may be allocated to the job request. The orchestration system 104 utilizes this specified resource allocation to determine which underlying machine to allocate the job to.

In another example, the resource requesting system 110 may be a test management system that manages synthetic tests (e.g., Pollinator offered by Atlassian, Inc.). The test management system is typically responsible for receiving test requests from client devices, scheduling synthetic tests based on test parameters included in the requests, and communicating descriptors of scheduled tests to the orchestration system 104. The test descriptors specify an allocation of resources to complete the test. The orchestration system 104 can then utilize the specified resource allocation to determine which underlying machine to allocate the tests to.

The type of jobs that are suitable for the presently disclosed scaling manager 106 and method are typically short lived—i.e., they can typically be completed in minutes or hours. However, in some embodiments, the typical jobs managed by the orchestration system 104 may take longer to complete and the scaling manager 106 of the present disclosure would still be capable of scaling the underlying resources in a responsive and efficient manner.

As illustrated in FIG. 1, communications between the various systems are via the communications network 108. The communication network 108 is depicted as a single network in FIG. 1 for ease of depiction. However, in actual implementation, the various systems illustrated in FIG. 1 may communicate with each other over different communication networks. For example, the container management system 104 and the resource provider 102 may communicate through one communication network whereas the scaling manager 106 and the orchestration system 104 may communicate over a different communication network. Similarly, the resource requesting systems 110 may communicate with the orchestration system 104 via a local network and with the resource provider 102 via a public network without departing from the scope of the present disclosure. Furthermore, the systems may communicate with each other over open web protocols such as (HTTPS, REST, and JWT).

Kubernetes System Overview

Some of the implementation details of the auto-scaling systems and methods of the present disclosure will be described with respect to a Kubernetes orchestration system 104. It will be appreciated that Kubernetes is merely used as an example to illustrate the calculations and the auto-scaling methods described herein are not limited to operating with Kubernetes but can operate with other orchestration systems as well.

Figure 2:
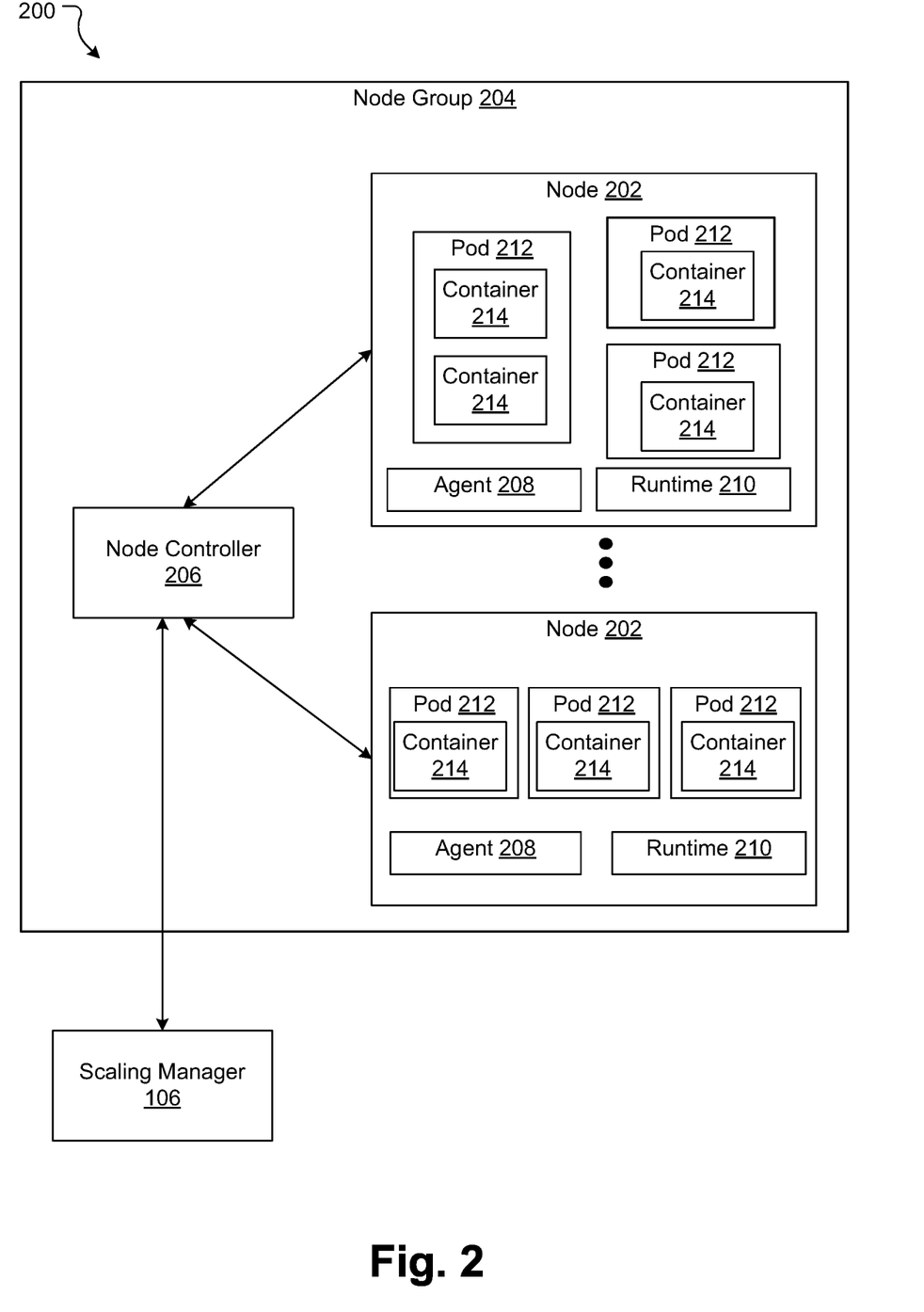
FIG. 2 is a block diagram of an example orchestration system in communication with the scaling manager.

FIG. 2 illustrates a typical Kubernetes architecture 200. In Kubernetes, an underlying compute resource (i.e., a physical or virtual machine) is called a node 202. A cluster of such worker machines that are all assigned to the same compute group is called a node group 204. It will be appreciated that a node group is an abstracted version of a compute group. Different resource requesting systems 110 may be assigned different node groups. Each node 202 in a particular node group 204 directly correlates with a corresponding compute resource assigned to the resource requesting system 110 by the resource provider 102 and in this disclosure the terms node and compute resource may be interchangeably used. Further, each node 202 in the node group 204 contains the services necessary to run containers and is managed by a common node controller 206.

The node controller 206 typically manages a list of the nodes 202 in the node group 204 and synchronizes this list with the resource provider's list of machines assigned to that particular resource requesting system 110. The node controller 206 may also be configured to communicate with the resource provider 102 from time to time to determine if an underlying machine is still available or not. If an underlying machine is not available, the controller 206 is configured to delete the corresponding node 202 from its list of nodes. In this manner, the node controller 206 is always aware of the infrastructure assigned to the node group by the resource provider 102.

Each node includes an agent 208 that is configured to ensure that containers are running within the node and a runtime 210 that is responsible for running the containers. With the help of the agent 208 and runtime 210, one or more pods 212 may be launched on the active nodes 202 in a node group 204. A pod 212 is the basic building block of Kubernetes. A pod 212 encapsulates one or more containers 214, storage resources (not shown), and options that govern how the containers 214 should run.

Typically, the node controller 206 can query the agent 208 running on each node 202 in the node group 204 to retrieve information about the nodes including the available resources on the node: the CPU, memory, and the maximum number of pods 212 that can be scheduled onto the node 202 at any given time. Further, the agent 208 can inform the controller 206 of all active pods on the node and the job requests scheduled for execution on the pods 212.

In some embodiments, the scaling manager 106 may be executed within a container inside the node group 204. In other implementations, the scaling manager 106 may be executed in a container outside the node group 204. In any event, the scaling manager 106 can communicate with the node controller 206 to obtain information about the nodes and the pods from time to time. For instance, the scaling manager 106 can request the controller 206 to provide a list of all nodes and active pods in the node group 204. Similarly, the scaling manager 206 may setup a "watch" on all the nodes and pods in the node group to receive a stream of updates for the nodes 202 and active pods 212 in the node group.

Thresholds and Timers

In some embodiments, the scaling manager 106 is configurable, i.e., the resource requesting system 110 can program the scaling manager 106 to be as responsive to variations in demand as required. This can be done via a number of programmable thresholds and rates. This section describes these programmable thresholds and rates.

The requesting system 110 can decide when the scaling manager 106 scales up or scales down the resources by setting upper and lower threshold values. The upper threshold value corresponds to a utilization value for the entire system above which the scaling manager 106 increases the number of available resource (e.g., increases the size of the node group 204). The lower threshold value corresponds to the utilization value for the entire system below which the scaling manager 106 decreases the number of available resources (e.g., decrease the size of the node group 204). The upper and lower threshold values can be set as required. For instance, if the requesting system 110 predicts that from time to time there may be a sudden spike of new job requests, the requesting system 110 can introduce a buffer capacity in the scaling manager 106 by setting the upper threshold value to a value lower than 100%, e.g., 70%. Alternatively, if a requesting system 110 is aware that their job requests or resource demand follows a gradual increase/decrease, the requesting system 110 may choose to set a higher upper threshold (e.g., 85%) to maintain a smaller buffer capacity or completely eliminate the buffer capacity by setting the upper threshold value to 100%.

Similarly, the lower threshold value can be set taking into consideration the costs associated with underutilized resources and at the same time the time and effort required to constantly terminate and start resources.

As noted previously, in some embodiments, instead of directly terminating compute resources/nodes when utilization is lower than the lower threshold value, the scaling manager 106 may mark the excess resources/nodes as 'unschedulable'. To this end, the scaling manager 106 requests the node controller 206 to update the properties of the selected nodes to indicate that these nodes are unschedulable. This prevents the orchestration system 104 from assigning any new jobs to the marked compute resources and can also allow any jobs that are active on the marked nodes to terminate before the nodes are permanently deleted.

In addition to marking, in some embodiments, the scaling manager 106 can scale down (or mark) the resources at a fast or slow rate. For instance, if the utilization decreases gradually between two checks, the scaling manager 106 can adopt a slow scale down rate where a predetermined number of resources/nodes are terminated or marked. Alternatively, if the utilization decreases significantly between two checks, e.g., because a large number of active jobs have completed and no other jobs are scheduled for execution, the scaling manager can adopt a fast scale down rate where a predetermined number of resources/nodes are terminated or marked. This predetermined number is of course higher than the predetermined number corresponding to the slow rate.

These slow and fast rates are also configurable. For example, instead of having one lower threshold, the requesting system 110 can configure two lower thresholds for marking nodes corresponding to the fast and slow rates. For instance, a requesting system 110 can configure a slow scaling threshold value, which corresponds to a utilization value for the entire system below which the scaling manager 106 marks a number of excess resources unschedulable at a slow rate. Similarly, the requesting system 110 can configure a fast scaling threshold value, which corresponds to a utilization value for the entire system below which the scaling manager 106 marks a number of resources unschedulable at a faster rate. For example, the slow scaling threshold value may be set as 40% utilization whereas the fast scaling threshold value may be set as 10%.

Further, the requesting system 110 can configure the predetermined number of resources/nodes to be marked or terminated in the fast and slow scale down modes. For example, the rate for removing/marking nodes in the slow scale down mode can be set as 2 nodes/underlying compute resources, whereas the rate for removing/marking nodes in fast scale-down mode can be set as 5 nodes/underlying compute resources.

In addition to these thresholds, the scaling manager 106 maintains a number of timers. These timers are started when corresponding actions are initiated and end at the end of a predefined time period. These timers include a node marking timer and a scale lock timer.

When the scaling manager 106 marks nodes, the marked nodes can be considered as 'standby nodes' for a particular period of time set by the node marking timer. If utilization increases above the upper threshold amount during this period, one or more marked nodes may be unmarked such that new pods can be assigned to those nodes. Alternatively, if utilization does not increase over the upper threshold value during the standby period and any active pods on the nodes have terminated, the scaling manager 106 can instruct the resource provider to terminate the corresponding computing infrastructure once the mark node timer expires. In one example, the node marking timer can be initiated when a corresponding node is marked. The node marking timer can be set for 2 minutes in one example.

In addition to this, a timeout timer may also be initiated when the corresponding node is marked. This timer is utilized for cases where, e.g., a job is executing on the marked node and has not completed executing even after the end of the node marking period and the node has not been unmarked. In such cases, the scaling manager 106 can instruct the resource provider to force delete the corresponding compute resource and any jobs or pods active on the compute resource after completion of the timeout timer. In one example, the timeout timer may be set to expire is 10 minutes after a node is marked as unschedulable.

A scale lock is a mechanism that is used to ensure that any previously attempted scale up or scale down requests from the scaling manager 106 have been successfully completed by the resource provider 102 before requesting additional scaling-up or scaling-down of resources. This helps prevent an "infinite" scale-up or scale-down due to the delay it takes for the orchestration system 104 to know that additional resources have been added and to add corresponding nodes in the node group 204 or conversely that nodes have been terminated by the resource provider and to delete corresponding nodes from the node group 204.

Figure 4A:
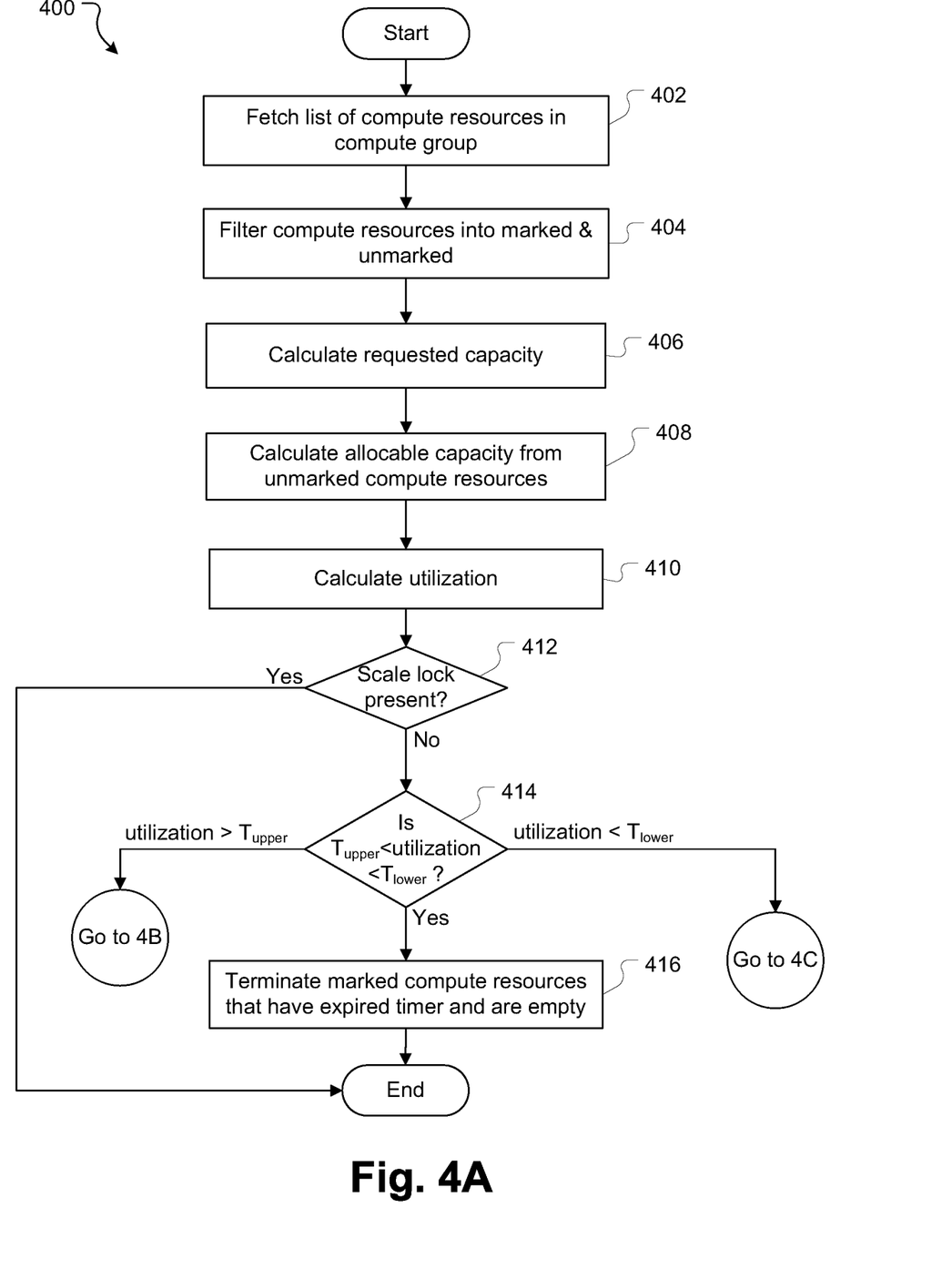
FIG. 4A is a flowchart illustrating an example method for scaling resources based on demand according to some embodiments of the present disclosure.
Figure 4B:
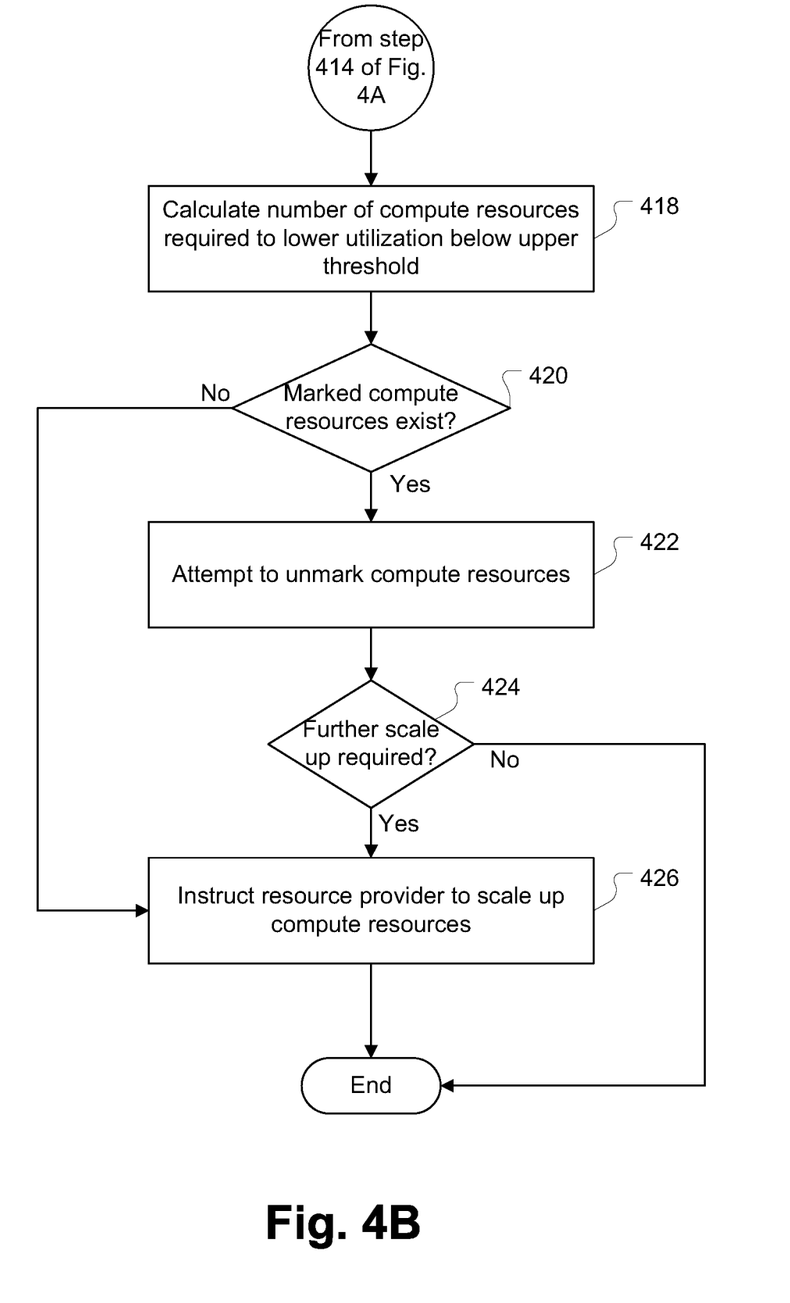
FIG. 4B is a flowchart illustrating an example method for scaling resources based on demand according to some embodiments of the present disclosure.
Figure 4C:
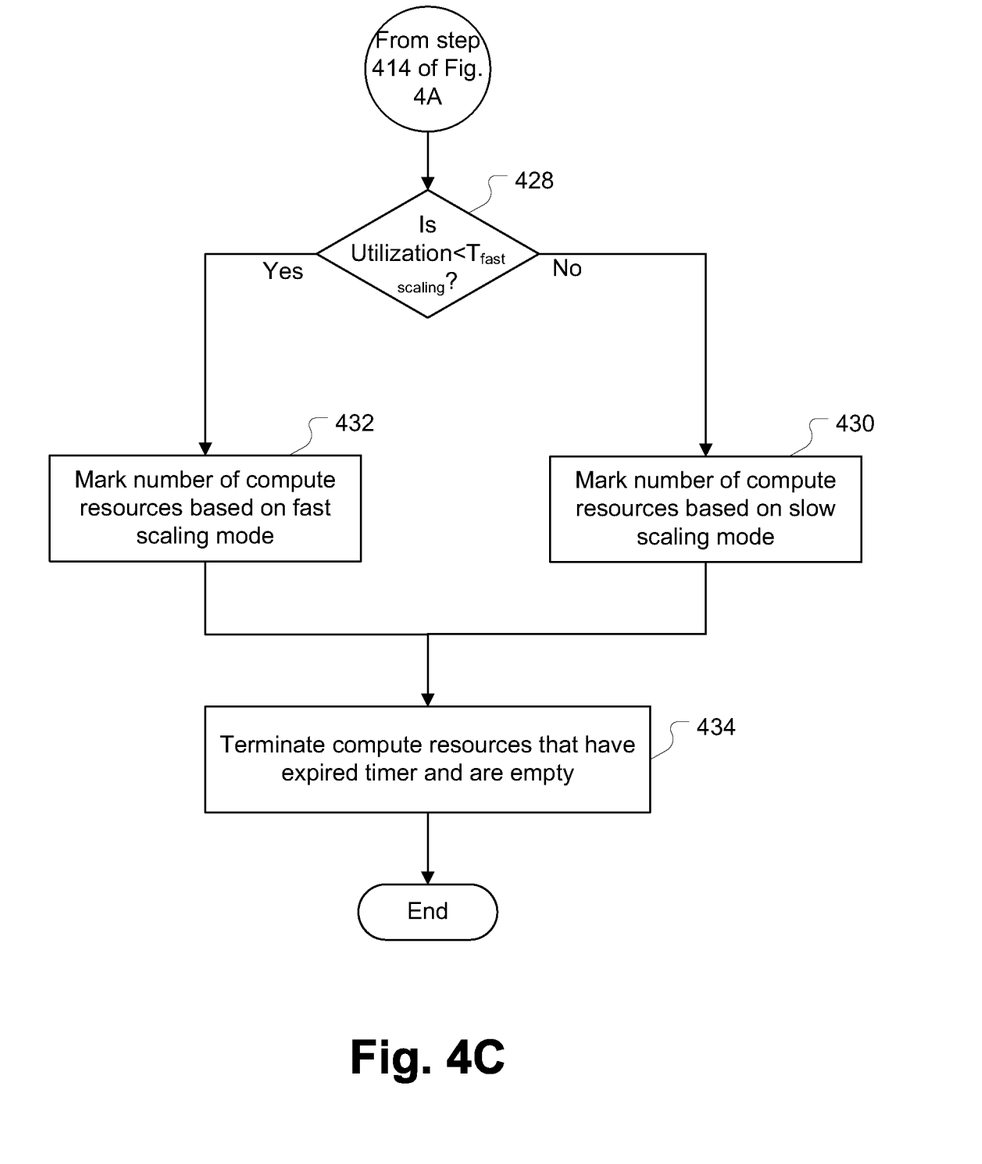
FIG. 4C is a flowchart illustrating an example method for scaling resources based on demand according to some embodiments of the present disclosure.

For example, consider the case where in a previous cycle of method 400 the scaling manager 106 instructs the resource provider 102 to add 6 additional physical/virtual machines to increase the overall node group size by 6. Before the resource provider 102 can complete this request and inform the orchestration system 104, the scaling manager 106 may execute another cycle of method 400. In this case, as the number of nodes in the node group 202 would not reflect the additional six nodes (as they haven't been updated by the resource provider 102 or orchestration system 104 as yet), the scaling manager 106 may request the resource provider 106 to add six additional resources in this cycle, causing the resource provider to add 12 resources where in reality only 6 additional resources were required. The scale lock can prevent this situation.

The scale lock mechanism also prevents the scaling manager 106 from issuing any scale-down commands whilst the resource provider 102 is mid-way through assigning/launching new resources. As such, the scale lock mechanism allows the scaling activity to safely finish before performing any additional actions that affect the node group 202.

The scale lock can be applied when a scaling instruction is issued to the resource provider 102. In some embodiments, once the scaling manager 106 issues an instruction to add/delete underlying compute resources, the scaling manager 106 can set a scale lock timer which is internally maintained by the scaling manager 106. The scale lock timer may be configured to timeout after a predetermined period (e.g., 2 minutes). Typically, this period is set taking into consideration the amount of time required for the resource provider 102 to perform the corresponding action, for the resource provider to inform the orchestration system 104 and/or the scaling manager 106 that the action has been performed, and for the orchestration system 104 to update the list of resources (e.g., nodes) it maintains based on the corresponding action.

Once the scale lock timer expires, the scaling manager 106 may be configured to retrieve a list of active resources maintained by the resource provider 102 and the orchestration system 104. If the numbers of resources match, the scaling manager 106 determines that the scaling operation has been successfully completed and removes the scale lock.

Alternatively, if for some reason, the numbers of resources maintained by the service provider 102 and the orchestration system 104 do not match after the scale lock timer has timed out, the scaling manager 106 may be configured to maintain the scale lock for an additional period of time. In certain embodiments, the scaling manager 106 can maintain a maximum timeout period timer (e.g., 10 minutes) as well. If for some reason (e.g., because the scaling manager 106 cannot reach the resource provider 102 to determine the number of resources maintained by the resource provider) the scale lock is not unlocked before the maximum timeout timer expires, the scaling manager 106 assumes that the scaling operation has filed and forcefully unlocks the scale lock. The scale lock timer and the maximum timeout timer are configurable—i.e., a resource requesting system 110 can set its own timeout periods.

It will be appreciated that the timers may be set and configured using any known computational techniques. For instance, the timers may be maintained by storing an expiry/timeout time. In case of the node marking timer, for example, the expiry time may be stored along with the properties/metadata associated with the node in the node controller 206 or agent 208. The current time can be compared with the expiry time to determine whether the timer has expired or not.

Exemplary methods

Figure 3:
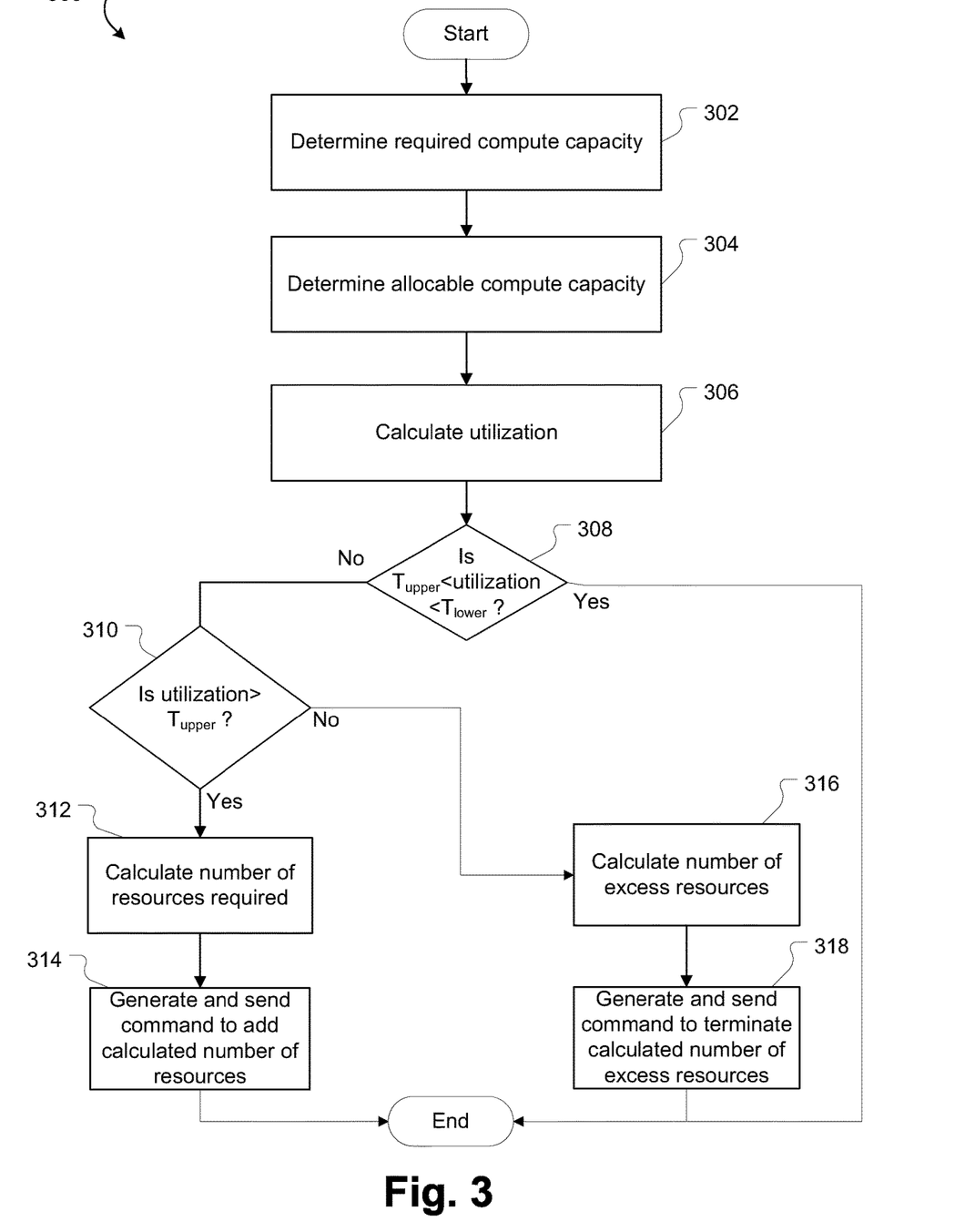
FIG. 3 is a flowchart illustrating an example method for scaling resources based on demand according to some embodiments of the present disclosure.

This section describes methods and processes for scaling resources based on demand Generally speaking, FIG. 3 describes an auto-scaling process according to some embodiments, whereas FIG. 4 FIGS. 4A-4C describe an auto-scaling process according to other embodiments. As noted previously, some non-limiting implementation details of the methods will be described with reference to Kubernetes as the orchestration system 104. Further, the methods of FIGS. 3 and 4 are repeated periodically (e.g., every 30 or 60 seconds).

The method 300 begins at step 302, where the scaling manager 106 determines the required compute capacity for a particular compute group in real time—i.e., it determines the CPU and memory required to complete the currently allocated job requests created by the resource requesting system 110. To this end, the scaling manager 106 may request the orchestration system 104 to provide a list of the current job requests.

In Kubernetes, the scaling manager 106 may fetch the status of all the nodes 202 and pods 212 in a node group 204. For instance, in the Kubernetes environment, this may be done by using a standard Kubernetes API call (via Kubernetes REST interface) such as 'get nodes' and 'get pods'. In another example, this information may be fetched continuously/periodically via the 'watch' function and may be stored in a cache in the scaling manager 106. This status typically includes the job requests assigned to each of the active pods. As noted previously, each job request may specify the resource allocation required to complete that job. The scaling manager 106 can add the resource allocation requirements of all the job requests to determine the requested compute resources at that specified time. For example, consider that a particular node group has 10 pods (each with a single container) and each container is requesting 500 m CPU and 100 mb memory allocation. The calculated total resource allocation requirements in this case would be 5000 m CPU and 1000 mb memory.

At step 304, the scaling manager 106 determines the allocable compute capacity of the compute group. In one example, the scaling manager 106 determines the available CPU and memory at each of the nodes 202. To launch containers on the underlying machines, the orchestration system 104 is aware at all times of the available capacity at each of the underlying physical/virtual machines. Accordingly, at step 204, the scaling manager 106 may obtain allocable capacity at each of the underlying machines from the orchestration system 104.

In Kubernetes, e.g., the capacity of each node 202 may be provided to the node controller 206 by the agent 208 and the scaling manager 106 may fetch this capacity information from the node controller 206. In some instances, this capacity information may be retrieved from the orchestration system 104 at the same time when status information for the active nodes and pods is collected. Further, the same or similar commands may be utilized to retrieve this information. Once the capacity information for each node is in hand, the scaling manager 106 combines the capacity of each node to determine the total allocable resources of the underlying infrastructure. For example, consider that a particular node group has 2 nodes, each with allocable resources of 1000 m CPU and 4000 mb memory. The calculated total capacity of the node group in this case would be 2000 m CPU and 8000 mb memory.

At step 306, the scaling manager 106 determines the utilization of the compute group. In certain embodiments, the utilization is determined as a percentage of the total required capacity divided by the total available capacity. For example, in the above two examples, the CPU utilization can be computed as total required CPU units/total available CPU units (i.e., 5000 m/2000m*100=250%) and the memory utilization can be computer as total required memory/total available memory (i.e., 1000 mb/8000 mb*100=12.5%). The higher of the two computed utilizations can then be utilized for scaling decisions. In this example, it will be the CPU utilization which is at 250%.

At step 308, a determination is made whether the calculated utilization exceeds an upper threshold value or is lower than a lower threshold value. The upper threshold value is the utilization value for the compute group above which the scaling manager 106 increases the number of available resource (e.g., increases the size of the node group 204). The lower threshold value is the utilization value for the compute group below which the scaling manager 106 decreases the number of available resources (e.g., decreases the size of the node group 204). The scaling manager 106 can compare the utilization value with the upper and lower threshold values to determine whether it lies between these values.

At step 308, if a determination is made that the calculated utilization is between the upper and lower threshold values, the scaling manager 106 does nothing and the method 300 ends.

Alternatively, if at step 308, it is determined that the calculated utilization is not between the upper and lower threshold values, the method proceeds to step 310 where a determination is made whether the utilization is higher that the upper threshold. If it is determined at the utilization is above the upper threshold value, the method 300 proceeds to step 312 where the scaling manager 106 calculates the additional resources required to decrease the utilization of the compute group to be below the upper threshold. In one embodiment, the additional resources can be calculated by using a percent decrease formula.

Continuing with the previous examples, if the upper threshold value is 70% and the CPU utilization is calculated as 250%, a scaling delta can be calculated as (250−70)/70=2.5714. This value is multiplied by the number of nodes 202 in the node group 204 to arrive at the number of additional nodes required to decrease the CPU utilization of the system to be below 70%. So, 2.5714*2=5.142=6 nodes. Therefore, by requesting the node group 204 to scale up by 6 nodes, the new total node count will be 8. With the new node count of 8, the node group utilization is as follows:
CPU=5000 m/8000 m*100=62.5%
Memory=1000 mb/3200 mb*100=3.125%

At step 314, the scaling manager 106 causes additional resources to be added to the compute group based on the calculated number of compute resources identified in the previous step. In one example, the scaling manager 106 generates and sends a request to the resource provider 102 to assign additional resources (e.g., physical/virtual machines) to the resource requesting system's active infrastructure. The number of additional resources requested corresponds to the number of additional resources calculated at step 312, e.g., 6 nodes in the above example. Once the resource provider 102 assigns the additional resources, it informs the orchestration system 104 that additional compute resources are added, which updates its list of nodes 202 for that node group 204 to include the newly added nodes 202.

In the alternative, if at step 310, a determination is made that the calculated utilization is not above the upper threshold, the method 300 proceeds to step 316 where the scaling manager 106 calculates the number of compute resources (e.g., nodes) that need to be released/terminated to increase the overall utilization to be above the lower threshold value. In one embodiment, this number of nodes can be calculated in a similar fashion to the calculation performed at step 312.

At step 318, the scaling manager 106 causes the number of active compute resources to reduce by the number of calculated compute resources in the previous step. In certain embodiments, this may be done by generating and sending a command to the resource provider to terminate/release the calculated number of physical/virtual machines from the compute group assigned to the resource requesting system 110. In certain embodiments, the scaling manager 106 may specify which resources/nodes should be terminated, whereas in other cases this may not be specified and the resource provider 102 may make this determination itself.

When the scaling manager 106 specifies the resources/nodes to be terminated at step 318, it may do this based on a suitable criterion. For example, in some cases, the scaling manager 106 may determine the oldest nodes in the node group 204 (i.e., the nodes that were created earliest) and request that one or more of the oldest nodes be terminated (based on the number of nodes calculated at step 314). To this end, the scaling manager 106 reviews the creation time of each of the nodes in the node list for the node group and prioritizes the nodes that were created earliest for termination. By terminating the oldest nodes first, the scaling manager 106 ensures that there are always newer nodes in the node group 204. Additionally, terminating older nodes first allows the resource requesting system 110 to slowly roll out configuration changes as newer nodes can be initialized and configured with new/updated configuration settings whereas the older nodes that are already executing based on older configuration settings are terminated.

In other examples, the scaling manager 106 may identify the newest nodes in the node group 204 and request that the newest nodes be terminated first. It will be appreciated that any other criterion can also be employed—e.g., the scaling manager 106 can determine that the nodes with the most allocable capacity be terminated first or that the nodes with the least allocable capacity be terminated first.

Similar to step 312, once the resource provider 102 deletes requested number of resources, it informs the orchestration system 104. The orchestration system 102 can then update its list of nodes 202 for that node group 204 to remove the deleted nodes.

FIGS. 4A-4C illustrate an end-to-end method of autoscaling process for scaling resources in a compute group based on demand that utilizes marking and different scale down rates.

The method begins at step 402, where the scaling manager 106 retrieves a list of active compute resources allocated to the compute group. For instance, the scaling manager 106 may be configured to retrieve a list of all the nodes and pods in a given node group from the orchestration system 104. In one embodiment, scaling manager 106 sets a watch on the node group 204 to receive a stream of updates of all the nodes 202 and pods 212 in the given node group 204 from the orchestration system 104. The updates may be stored in an internal cache maintained by the scaling manager 106. Alternatively, the scaling manager 106 may communicate with the orchestration system 104 to retrieve this information when the method step 402 executes. The information retrieved either from the internal cache or directly from the orchestration system 104 at this step may include, e.g., a list of all the pods scheduled in the node group; a list of all the nodes in the node group; names of all the nodes, their allocable capacity, the number of pods currently active on the nodes, the status of the nodes (e.g., marked or unmarked), their creation time; the names of the pods, their creation time, etc.

At step 404, the scaling manager 106 filters the list of compute resources into marked and unmarked compute resources (e.g., marked and unmarked nodes). To this end, the scaling manager 106 may filter the list of fetched nodes based on the properties field of the nodes that indicates whether the node is marked unschedulable or not.

At step 406, the scaling manager 106 calculates the requested capacity for the compute group—i.e., it determines the CPU and memory required to complete all the currently allocated job requests created by the resource requesting system 110. To this end, the scaling manager 106 may retrieve the requests queued for execution or currently executing at each of the pods 212 in the node group 202. This step is similar to step 302 of FIG. 3 and therefore is not described in any further detail here.

Next (at step 408), the scaling manager 106 ignores the marked compute resources in its calculation of allocable capacity and determines the allocable capacity in the compute group based on the unmarked compute resources in the compute group. In particular, the scaling manager 106 determines the total CPU and memory that can be utilized at the unmarked compute resources or nodes. As noted previously, in Kubernetes, the capacity of each node 202 may be provided to the node controller 206 by the agent 208 and the scaling manager 106 may fetch this capacity information from the node controller 206. It then adds the capacity of each node to determine the total allocable resources of the underlying infrastructure.

At step 410, the utilization of the unmarked compute resources in the compute group is calculated. In certain embodiments, the utilization is determined as a percentage of the total requested capacity divided by the total allocable capacity. Further, as described with reference to FIG. 3, the utilization may be calculated separately for CPU usage and memory usage. The scaling manager 106 can determine which of the calculated utilizations at step 410 is greater (the CPU or the memory) and then utilize the higher utilization value for further calculations.

Before determining if the compute group and corresponding node group 204 requires scaling based on the calculated utilization, the scaling manager 106 determines whether there is any scale lock in place at step 412. If a determination is made at this step that the scale lock is not released (e.g., because a previously requested scaling operation is not yet completed), the method 400 ends. The method 400 may then re-run after a predetermined period of time.

Alternatively, if a determination is made that the scale lock is released, the method proceeds to step 414, where a determination is made whether the higher of the calculated utilizations falls between the slow scaling threshold value and the upper threshold value or if the calculated utilization is higher than the upper threshold or lower than the slow scaling threshold.

Based on this determination, the scaling manager 106 can perform one of three actions—do nothing, scale up, or scale down. If at step 414 a determination is made that the calculated utilization is between the upper and slow scaling threshold values, the scaling manager 106 does nothing. However, it may perform some administrative tasks on the marked nodes at step 418.

As described previously, instead of directly terminating nodes, the scaling manager 106 can mark excess nodes as unschedulable for a certain period of time. To this end, whenever a node is marked as unschedulable, a node marking timer that is set to expire after a predetermined period of time is started. At step 416, the scaling manager 106 checks if the node marking time for any of the marked nodes has expired. In certain embodiments, when a node is marked as unschedulable, the orchestration system 104 updates the properties/metadata of the node to indicate that the node is marked. The orchestration system 104 can also set an expiry time for the marking within the properties/metadata of the node. In such embodiments, the scaling manager 106 may be configured to determine whether the Qcurrent time is equal to or exceeds the expiry time. It also checks if any pods or containers are still running on the marked nodes, e.g., by requesting the node controller to provide a list of all pods running on the identified node.

If the scaling manager 106 identifies that the node marking timer for any of the marked nodes has expired and they are empty, it instructs the resource provider 106 to terminate the corresponding underlying resources and applies the scale lock at step 416. In addition, if a node marking timer has expired for a particular node, but the node still has active pods, the scaling manager 106 checks if the timeout timer for that node has expired. If this is a case for any of the nodes that still have active pods, an instruction to terminate the identified nodes is also provided to the resource provider 102 at step 416.

Alternatively, if at step 414, it is determined that the calculated utilization is higher that the upper threshold, the method 400 proceeds to step 418 where the scaling manager 106 calculates the additional resources required to decrease the utilization of the compute group to be below the upper threshold. This calculation is similar to the calculation performed at step 310 of FIG. 3.

Next (at step 420), a determination is made if there are any marked compute resources in the compute group, e.g., by checking the properties of the list of nodes retrieved at step 402. If one or more marked nodes exist, at step 422, the scaling manager 106 attempts to unmark at least as many marked nodes as the number of additional resources calculated at step 418. For example, if 6 additional compute resources (or nodes) are required and there are 10 marked nodes in the node group, the scaling manager attempts to unmark 6 of these marked nodes. Alternatively, if 6 additional compute resources are required and there are 2 marked nodes in the node group, the scaling manager attempts to unmark both the marked nodes.

Once marked nodes are unmarked, the scaling manager 106 determines whether the number of unmarked nodes is sufficient to decrease the utilization of the compute group to be below the upper threshold at step 424.

If a determination is made that the number of unmarked nodes are insufficient to decrease the utilization of the compute group to be below the upper threshold, e.g., because the total number of additional compute resources calculated at step 418 was 6 and the scaling manager was only able to unmark 2 nodes, the method proceeds to step 426 where the scaling manager 106 sends a request to the resource provider 102 to assign additional compute resources to the compute group and the scale lock is applied (e.g. 4 more resources). Once the resource provider 102 assigns the additional resources, the orchestration system 104 is informed, which updates its list of nodes 202 for that node group 204 to include the newly added nodes 202. The scale lock can then be released (if it hasn't already timed out).

In the alternative, if at step 424 it is determined that the number of unmarked compute resources is sufficient to decrease the utilization of the entire system to be below the upper threshold value, the method 400 ends.

Further, at step 420, if a determination is made that there are no marked compute resources in the node group 204, the method proceeds straight to step 426.

Returning to step 414, if a determination is made that the calculated utilization is lower than the slow scaling threshold value, the method 400 proceeds to scale down the resources by marking and/or terminating resources. To this end, at step 430, a determination is made whether the calculated utilization is below the fast scaling threshold value. In one example, this is done by comparing the calculated utilization value with the slow and fast scaling threshold values preset for the scaling manager 106.

If a determination is made that the calculated utilization value is greater than the fast scaling threshold, the scaling manager 106 adopts the slow scaling mode and the method proceeds to step 430 where the scaling manager 106 marks the number of nodes corresponding to the predetermined number of compute resources configured for the slow scale down mode (e.g., 2 nodes).

Alternatively, if a determination is made that the calculated utilization value is lower than the fast scaling threshold value at step 428, the scaling manager 106 adopts the fast scaling mode and the method proceeds to step 432 where the scaling manager 106 marks the number of nodes corresponding to the predetermined number of compute resources configured for the fast scale down mode (e.g., 5 nodes).

As described with reference to FIG. 3, the scaling manager 106 may select the compute resources for marking based on one or more criteria. For instance, it may attempt to mark the oldest nodes, the newest nodes, the nodes with the least number of active pods, or the nodes with the most number of active pods.

At the end of method step 430 or 432, the method proceeds to step 434, where the scaling manager 106 checks if the node marking timer for any of the marked nodes has expired. It also checks if any jobs are currently executing on the marked node. To this end, it may check if any pods or containers are still running on the marked nodes, e.g., by requesting the node controller 206 to provide a list of all pods running on the identified node(s). If the scaling manager 106 identifies that the marking node timer has expired for any of the marked nodes that are empty, it instructs the resource provider 106 to terminate the corresponding underlying compute resources and applies the scale lock. In addition, if the node marking timer has expired, but the node still has active pods, the scaling manager 106 checks if the timeout timer for that node has expired. If this is the case for any of the nodes that still have active pods, an instruction to terminate the identified nodes is provided to the resource provider 102.

In method 400, the scaling manager 106 is configured to vary its scale down rate based on the rate at which the load on the compute group decreases. However, in other embodiments, instead of having predefined rates and predefined number of nodes to mark or terminate, the scaling manager 106 may simply have a lower threshold value (as described with respect to FIG. 3). If the utilization falls below this lower utilization value, the scaling manager 106 may calculate the number of compute resources required to bring the utilization value to a value higher than the lower threshold. This calculation can be similar to the calculation performed for determining the number of compute resources required to bring the utilization value to a value lower than the upper threshold at steps 312 and 418.

Hardware Overview

The operations/techniques described herein are implemented by one or more computing systems or devices. For example, in environment 100: the resources provided by the resource provider may be one or more computer systems; the orchestration system 104 may be provided by one or more computer systems; the resource requesting systems 110 may be provided by one or more computer systems; and the scaling manager 106 may be executed on a computer system.

The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The computing devices may be desktop computer systems, portable computer systems, handheld devices, networking devices or any other device that incorporates hard-wired and/or program logic to implement relevant operations.

Figure 5:
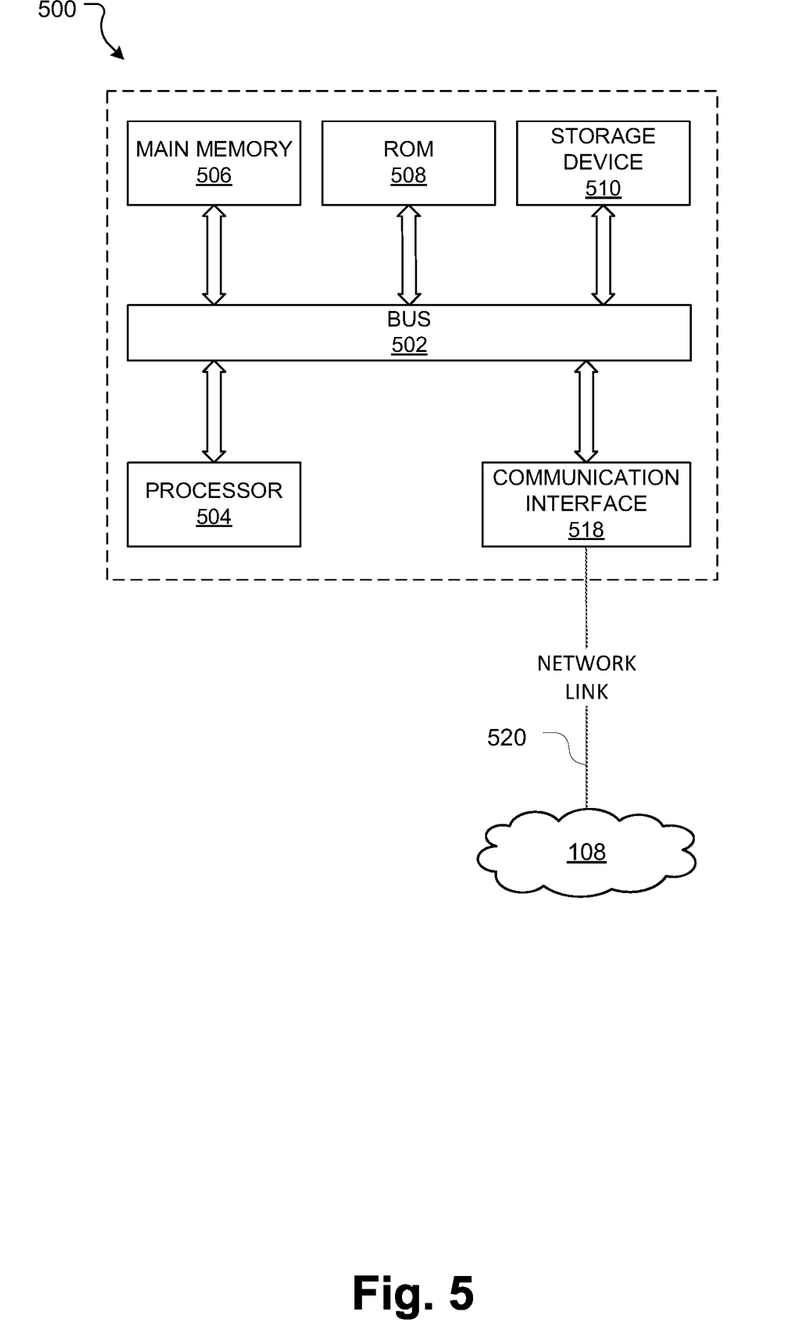
FIG. 5 is a block diagram of an example computer system on which some aspects of the present disclosure can be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 302 for storing information and instructions.

According to one embodiment, the methods disclosed herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to network 108. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks 108 to other computing systems. For example, if the computing system 500 is part of the physical machines assigned to a resource requesting system 110, the network link 520 may provide a connection through network 108 to the orchestration system 104 or the resource requesting system 110.

Computer system 500 can send messages and receive data, including program code, through the network(s), network link 520 and communication interface 518. In the resource provider example, a computer system 500 may receive requests for launching containers from the orchestration system 104 through the network 108 and communication interface 518.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

The invention claimed is:

1. A computer implemented method for scaling compute resources in a compute group, the method comprising:
   determining a buffer capacity associated with the compute group;
   determining an amount of compute capacity required to complete a task;
   determining an amount of allocable compute capacity available on the compute resources in the compute group;
   calculating a utilization of the compute group based on the amount of required compute capacity, the buffer capacity, and the amount of allocable compute capacity;
   in response to the utilization of the compute group being above an upper threshold:
      determining a number of additional compute resources to instantiate into the compute group necessary to bring the utilization of the compute group below the upper threshold;
      determining whether the utilization of the compute group falls above or below a first fast scaling threshold;
      upon determining that the utilization falls above the first fast scaling threshold, adopting a fast scaling mode for the compute group and instantiating, within a first time period, the number of additional compute resources into the compute group; and
      upon determining that the utilization falls below the first fast scaling threshold, adopting a slow scaling mode for the compute group and instantiating, within a second time period, the number of additional compute resources into the compute group, wherein the first time period is less than the second time period;
   in response to the utilization of the compute group being below a lower threshold, wherein the lower threshold is less than the upper threshold:
      determining a number of excess compute resources to remove from the compute resources necessary to bring the utilization of the compute group above the lower threshold in the compute group;
      determining whether the utilization of the compute group falls above or below a second fast scaling threshold;
      upon determining that the utilization falls above the second fast scaling threshold, adopting a slow scaling down mode for the compute group and terminating, within a third time period, the number of excess compute resources in the compute group; and
      upon determining that the utilization falls below the second fast scaling threshold, adopting a fast scaling down mode for the compute group and terminating, within a fourth time period, the number of excess compute resources in the compute group, wherein the fourth time period is less than the third time period.

2. The computer implemented method of claim 1, further comprising:
   setting a scale lock timer configured to expire after a predetermined time, wherein the predetermined time is based at least on an amount of time required to complete the instantiating;
   in response to an expiration of the predetermined time, determining if the instantiating of the additional compute resources was successful based at least in part on a list of active compute resources in the compute group; and
   in response to a successful instantiation of the additional compute resources, removing the scale lock timer.

3. The computer implemented method of claim 1, wherein determining the number of additional compute resources to instantiate comprises determining a percent decrease to bring the utilization of the compute group below the upper threshold.

4. The computer implemented method of claim 1, wherein determining that the utilization is below the lower threshold includes determining a number of compute resources that have been unused over a predetermined time period.

5. The computer implemented method of claim 1, wherein the buffer capacity is obtained from a user input provided to an application.

6. The computer implemented method of claim 1, wherein:
   at least one of the compute resources is designated as unschedulable for a predetermined period of time; and
   any compute resources designated as unschedulable are excluded from the amount of allocable compute capacity over at least the predetermined period of time.

7. The computer implemented method of claim 6, wherein determining the number of additional compute resources to instantiate into the compute group comprises:
   identifying the at least one of the compute resources designated as unschedualble; and
   excluding the at least one of the compute resources designated as unschedulable for the number of additional compute resources to instantiate into the compute resources in the compute group.

8. A scaling system for scaling compute resources in a compute group, the system comprising:
   a processor; and
   a non-transitory computer-readable storage medium storing computer executable instructions which, when executed by the processor, cause the processor to:
      determine a buffer capacity associated with the compute group;
      determine an amount of compute capacity required to complete a task;
      determine an amount of allocable compute capacity available on the compute resources in the compute group;
      calculate a utilization of the compute group based on at least one of the amount of required compute capacity, the amount of allocable compute capacity, and the buffer capacity; and
      in response to determining that the utilization of the compute group being above an upper threshold:
         determine a number of additional compute resources to instantiate into the compute group necessary to bring the utilization of the compute group below the upper threshold;
         determine whether the utilization of the compute group falls above or below a fast scaling threshold value;
         upon determining that the utilization falls above the fast scaling threshold value, adopt a fast scaling mode for the compute group and instantiating, within a first time period, the number of additional compute resources into the compute group; and
         upon determining that the utilization falls below the fast scaling threshold value, adopt a slow scaling mode for the compute group and instantiating, within a second time period, the number of additional compute resources into the compute group, wherein the first time period is smaller than the second time period.

9. The scaling system of claim 8, wherein the computer executable instructions further cause the processor to, in response to determining that the utilization of the compute group satisfies an under-utilization criteria:
   determine a number of excess compute resources to terminate in the compute group; and
   terminate the number of excess compute resources in the compute group.

10. The scaling system of claim 8, wherein:
   the task is one or more tasks; and
   to determine the amount of required compute capacity required to complete the one or more tasks, the computer executable instructions further cause the processor to:
      retrieve a list of the one or more tasks;
      determine a respective amount of required compute capacity required to complete each task from the list of the one or more tasks; and
      calculate a sum of each of the respective amount of required compute capacity required to complete each task to determine the amount of required compute capacity required to complete the one or more tasks.

11. The scaling system of claim 8, wherein:
   at least one of the compute resources is designated as unschedulable for a predetermined period of time; and
   any compute resources designated as unschedulable are excluded from the amount of allocable compute capacity over at least the predetermined period of time.

12. The scaling system of claim 11, wherein the at least one of the compute resources marked as unschedulable is associated with a node marking timer set to expire after the predetermined period of time.

13. The scaling system of claim 12, wherein, when the node marking timer expires after the predetermined period of time, the computer executable instructions further cause the processor to terminate the at least one of the compute resources designated as unschedulable.

14. The scaling system of claim 11, wherein the computer executable instructions further cause the processor to not incorporate the at least one of the compute resources marked as unschedulable in the number of additional compute resources to instantiate into the compute resources in the compute group.

15. A computer-implemented method for scaling compute resources in a compute group, the method comprising:
   determining an amount of required compute capacity to complete a task;
   determining an amount of allocable compute capacity available on the compute resources in the compute group;
   calculating a utilization of the compute group based on the amount of required compute capacity and the amount of allocable compute capacity;
   in response to the utilization of the compute group being above an upper threshold:
      instantiating at least one additional compute resource into the compute group to bring the utilization below the upper threshold;
      setting a scale lock timer configured to expire after a predetermined time, wherein the predetermined time is based at least on an amount of time required to complete the instantiating;
      in response to an expiration of the predetermined time, determining if the instantiating of the additional compute resources was successful based at least in part on a list of active compute resources in the compute group; and
      in response to a successful instantiation of the additional compute resources, removing the scale lock timer.

16. The computer-implemented method of claim 15, further comprising:
   adding a buffer capacity to the upper threshold resulting in a modified upper threshold;
   determining that the utilization falls above the modified upper threshold; and
   in response to determining that the utilization falls above the modified upper threshold, determining whether the utilization of the compute group falls above or below a fast scaling threshold value.

17. The computer-implemented method of claim 16, further comprising:
   upon determining that the utilization falls above the fast scaling threshold value, adopting a fast scaling mode for the compute group and instantiating, within a first time period, the at least one additional compute resource into the compute group; and
   upon determining that the utilization falls below the fast scaling threshold value, adopting a slow scaling mode for the compute group and instantiating, within a second time period, at least one additional compute resource into the compute group, wherein the first time period is less than the second time period.

18. The computer-implemented method of claim 15, wherein the list of active compute resources is a first list of active compute resources and further comprising:
   in response to determining that the utilization of the compute group satisfies an under-utilization criteria:
      determining a number of excess compute resources to terminate in the compute group; and
      terminating the number of excess compute resources in the compute group;
      setting a second scale lock timer configured to expire after a second predetermined time period, wherein the second predetermined time period is based at least on an amount of time required to complete the terminating;
      in response to an expiration of the second predetermined time period, determining if the terminating was successful based at least in part on a second list of active compute resources in the compute group; and
      removing the scale lock timer in response to determining that the terminating was successful.

\* \* \* \* \*